(12) United States Patent
Hunkeler (10) Patent No.: US 6,950,655 B2
(45) Date of Patent: Sep. 27, 2005

(54) METHOD AND SYSTEM WHEREIN HANDOVER INFORMATION IS BROADCAST IN WIRELESS LOCAL AREA NETWORKS

(75) Inventor: Teresa Hunkeler, Montreal (CA)

(73) Assignee: InterDigital Technology Corporation, Wilmington, DE (US)

( * ) Notice: Subject to any disclaimer, the term of this patent is extended or adjusted under 35 U.S.C. 154(b) by 66 days.

(21) Appl. No.: 10/600,403

(22) Filed: Jun. 20, 2003

(65) Prior Publication Data

US 2004/0063426 A1 Apr. 1, 2004

Related U.S. Application Data (60) Provisional application No. 60/415,727, filed on Oct. 1, 2002.

(51) Int. Cl.[7] .................................................. H04Q 7/20
(52) U.S. Cl. ..................... 455/426.1; 455/443; 455/525; 455/552.1; 370/329; 370/341
(58) Field of Search .............................. 455/403, 426.1, 455/430, 443, 525, 552.1, 554.2, 560; 370/329, 341

(56) References Cited

U.S. PATENT DOCUMENTS

| | | | |
|---|---|---|---|
| 5,666,650 A | * | 9/1997 | Turcotte et al. .............. 370/329 |
| 5,960,365 A | | 9/1999 | Leih et al. |
| 6,128,490 A | * | 10/2000 | Shaheen et al. ............. 455/434 |
| 6,272,315 B1 | | 8/2001 | Chang et al. |
| 6,370,380 B1 | | 4/2002 | Norefors et al. |
| 6,473,413 B1 | | 10/2002 | Chiou et al. |
| 6,615,044 B2 | | 9/2003 | Tigerstedt et al. |
| 6,657,981 B1 | | 12/2003 | Lee et al. |
| 6,792,283 B1 | * | 9/2004 | Roberts et al. ............. 455/525 |
| 2002/0085719 A1 | * | 7/2002 | Crosbie ...................... 380/248 |
| 2002/0105913 A1 | | 8/2002 | Miya |
| 2002/0105927 A1 | | 8/2002 | Holma et al. |
| 2002/0137514 A1 | | 9/2002 | Mitsugi et al. |

* cited by examiner

Primary Examiner—William Trost
Assistant Examiner—James D Ewart
(74) Attorney, Agent, or Firm—Volpe and Koenig, P.C.

(57) ABSTRACT

A method and system wherein handover information is broadcast in a wireless local area network. Handover information is broadcast in a beacon frame thereby allowing WTRUs operating in a wireless area network to handover to available alternative systems as desired. WTRUs may read the beacon frame and obtain appropriate information for handing over to alternative systems having coverage areas that overlap that of the wireless local area network. The alternative systems may be any type of wireless system and the wireless local area network may be any type of wireless area network.

25 Claims, 6 Drawing Sheets

LEGEND
AREA 1: ONLY 802.11b SYSTEM
AREA 2: 802.11b SYSTEM AND ALTERNATIVE TECHNOLOGY A
AREA 3: 802.11b SYSTEM AND ALTERNATIVE TECHNOLOGY A AND B
AREA 4: 802.11b SYSTEM AND ALTERNATIVE TECHNOLOGY B
AREA 5: 802.11b SYSTEM AND ALTERNATIVE TECHNOLOGY C
AREA 6: 802.11b SYSTEM AND ALTERNATIVE TECHNOLOGY A AND C

*FIG. 1*

| ORDER | INFORMATION | NOTES |
|---|---|---|
| 1 | TIMESTAMP | |
| 2 | BEACON INTERVAL | |
| 3 | CAPABILITY INFORMATION | |
| 4 | SSID | |
| 5 | SUPPORTED RATES | |
| 6 | FH PARAMETER SET | THE FH PARAMETER SET INFORMATION ELEMENT IS PRESENT WITHIN BEACON FRAMES GENERATED BY STAs USING FREQUENCY-HOPPING PHYs. |
| 7 | DS PARAMETER SET | THE DS PARAMETER SET INFORMATION ELEMENT IS PRESENT WITHIN BEACON FRAMES GENERATED BY STAs USING DIRECT SEQUENCE PHYs. |
| 8 | CF PARAMETER SET | THE CF PARAMETER SET INFORMATION ELEMENT IS ONLY PRESENT WITHIN BEACON FRAMES GENERATED BY APs SUPPORTING A PCF. |
| 9 | IBSS PARAMETER SET | THE IBSS PARAMETER SET INFORMATION ELEMENT IS ONLY PRESENT WITHIN BEACON FRAMES GENERATED BY STAs IN AN IBSS. |
| 10 | TIM | THE TIM INFORMATION ELEMENT IS ONLY PRESENT WITHIN BEACON FRAMES GENERATED BY APs. |

*FIG. 2* PRIOR ART

| ORDER | INFORMATION | NOTES |
|---|---|---|
| 1 | TIMESTAMP | |
| 2 | BEACON INTERVAL | |
| 3 | CAPABILITY INFORMATION | |
| 4 | SSID | |
| 5 | SUPPORTED RATES | |
| 6 | FH PARAMETER SET | THE FH PARAMETER SET INFORMATION ELEMENT IS PRESENT WITHIN BEACON FRAMES GENERATED BY STAs USING FREQUENCY-HOPPING PHYs. |
| 7 | DS PARAMETER SET | THE DS PARAMETER SET INFORMATION ELEMENT IS PRESENT WITHIN BEACON FRAMES GENERATED BY STAs USING DIRECT SEQUENCE PHYs. |
| 8 | CF PARAMETER SET | THE CF PARAMETER SET INFORMATION ELEMENT IS ONLY PRESENT WITHIN BEACON FRAMES GENERATED BY APs SUPPORTING A PCF. |
| 9 | IBSS PARAMETER SET | THE IBSS PARAMETER SET INFORMATION ELEMENT IS ONLY PRESENT WITHIN BEACON FRAMES GENERATED BY STAs IN AN IBSS. |
| 10 | TIM | THE TIM INFORMATION ELEMENT IS ONLY PRESENT WITHIN BEACON FRAMES GENERATED BY APs. |
| 11 | ALTERNATIVE TECHNOLOGIES | ALTERNATIVE TECHNOLOGIES PRESENT IN THE SAME GEOGRAPHICAL AREA |

| ORDER | INFORMATION | NOTES |
|---|---|---|
| 1 | TIMESTAMP | |
| 2 | BEACON INTERVAL | |
| 3 | CAPABILITY INFORMATION | |
| 4 | SSID | |
| 5 | SUPPORTED RATES | |
| 6 | FH PARAMETER SET | THE FH PARAMETER SET INFORMATION ELEMENT IS PRESENT WITHIN BEACON FRAMES GENERATED BY STAs USING FREQUENCY-HOPPING PHYS. |
| 7 | DS PARAMETER SET | THE DS PARAMETER SET INFORMATION ELEMENT IS PRESENT WITHIN BEACON FRAMES GENERATED BY STAs USING DIRECT SEQUENCE PHYS. |
| 8 | CF PARAMETER SET | THE CF PARAMETER SET INFORMATION ELEMENT IS ONLY PRESENT WITHIN BEACON FRAMES GENERATED BY APS SUPPORTING A PCF. |
| 9 | IBSS PARAMETER SET | THE IBSS PARAMETER SET INFORMATION ELEMENT IS ONLY PRESENT WITHIN BEACON FRAMES GENERATED BY STAs IN AN IBSS. |
| 10 | TIM | THE TIM INFORMATION ELEMENT IS ONLY PRESENT WITHIN BEACON FRAMES GENERATED BY APs. |
| 11 | ALTERNATIVE TECHNOLOGY A | ALTERNATIVE TECHNOLOGY PRESENT IN THE SAME GEOGRAPHICAL AREA |
| 12 | ALTERNATIVE TECHNOLOGY B | ALTERNATIVE TECHNOLOGY PRESENT IN THE SAME GEOGRAPHICAL AREA |
| ... | | |
| x | ALTERNATIVE TECHNOLOGY n | ALTERNATIVE TECHNOLOGY PRESENT IN THE SAME GEOGRAPHICAL AREA |

METHOD AND SYSTEM WHEREIN HANDOVER INFORMATION IS BROADCAST IN WIRELESS LOCAL AREA NETWORKS

CROSS REFERENCE TO RELATED APPLICATION(S)

This application claims priority from U.S. Provisional Application No. 60/415,727 filed Oct. 1, 2002, which is incorporated by reference as if fully set forth.

FIELD OF INVENTION

The present invention relates generally to broadcasting handover or roaming information within a wireless local area network. More particularly, the present invention relates to providing handover information in wireless local area networks so that users may handover from wireless local area networks to alternative wireless systems whose geographic coverage areas overlap that of the wireless local area networks.

BACKGROUND

In wireless local area networks (WLAN), an access point (AP) or base station (BS) serving a particular cell broadcasts a beacon signal periodically (e.g., every 100 ms). An active WTRU scans the beacon signal and associates itself with the AP having the strongest beacon. A conventional beacon contains information corresponding to the AP such as a timestamp, beacon interval, capabilities, extended service set (ESS) identification (ID), and traffic indication map (TIM). The WTRU uses the conventional beacon to distinguish between different APs. The WTRU tracks the received signal strength (RSS) of the beacon. When the RSS becomes weak, the WTRU starts to scan for stronger beacons from neighboring APs.

The WLAN conventional scanning process can be either active or passive. In passive scanning, the WTRU simply listens to available beacons. In active scanning, the WTRU sends a probe request to a targeted set of APs that are capable of receiving its probe. In the case of active scanning, each AP that receives the probe responds with a probe response that contains the same information that is available in a conventional beacon with the exception of the TIM. The TIM is used to alert or wake-up APs and is therefore not necessary where an AP is providing a solicited response by responding to a probe request.

In order to facilitate interoperability between WLANs and available alternative systems (i.e. other systems whose coverage areas overlap that of the WLANs), however, it is of interest to allow WTRUs operating within a WLAN to detect the presence of these alternative available systems. One approach for accomplishing this task when handing over from a WLAN to a public land mobile network (PLMN) is to perform a cell search for PLMN availability while simultaneously using the WLAN for communication. This approach may be implemented by having the WTRU's PLMN receiver on and searching for available networks while the WTRU uses the WLAN for communication. The disadvantage of this approach is that it is time consuming and requires the simultaneous activation of a WTRU's WLAN and PLMN functionality. This results in increased complexity and increased battery consumption, and does not permit the WLAN to direct the traffic to a specific PLMN network. Furthermore, this approach is limited to handover from WLANs to PLMNs.

Another approach is where the search for the availability of a specific available PLMN is done manually. With this approach, in addition to being limited to PLMNs, users must manually select one network over the other which is inconvenient and time consuming.

Accordingly, it would be desirable to provide handover information without the disadvantages and limitations of the prior art.

SUMMARY

The present invention provides a method and system for broadcasting information for handover from WLANs to available alternative systems. WTRUs can then read the alternative system information without having to do a search and may handover to any type of available alternative system, as desired.

A frequently implemented WLAN, for example, is an 802.11b network. The 802.11 standard includes a "beacon frame" to allow an access point to inform WTRUs of system parameters. This beacon frame has available information elements for future services. Some of these currently unused information elements can be used to broadcast information about available alternative systems. Rather than WTRUs tracking beacons based on RSS, the present invention enables WTRUs to access alternative system information at any time, allowing them to interact with available alternative systems, as desired. Information about available alternative systems is broadcast and may include, for example, network type, network identity, cell information about surrounding cells, and information about what services are offered by the available alternative system.

BRIEF DESCRIPTION OF THE DRAWING(S)

A more detailed understanding of the invention may be had from the following description, given by way of example and to be understood in conjunction with the accompanying drawings wherein.

The following terms and acronyms are used in this application:

PLMN     public land mobile network
GSM     global system for mobile communications -continued

| | |
|---|---|
| UMTS | universal mobile telecommunications system |
| GPRS | general packet radio service |
| IMS | IP Multimedia System |
| WLAN | wireless local area network |
| CDMA | code-division multiple access |
| UE | user equipment |
| WTRU | wireless transmit/receive unit |

DETAILED DESCRIPTION OF THE PREFERRED EMBODIMENT(S)

By way of introduction, a wireless transmit/receive unit (WTRU) as used herein includes, but is not limited to, a UE, mobile station, fixed or mobile subscriber unit, pager, or any other type of client device capable of operating in any type of wireless environment. Exemplary types of wireless environments include but are not limited to WLANs and PLMNs. The WTRUs described herein are preferably capable of operating in both WLANs and PLMNs.

When referred to hereafter, an access point (AP) includes but is not limited to a base station (BS), Node-B, site controller, or other interfacing device in a wireless environment. Furthermore, the terms available alternative technology and available alternative system may be used interchangeably to refer to a wireless system that a WTRU operating in a WLAN may handover to.

Figure 1:
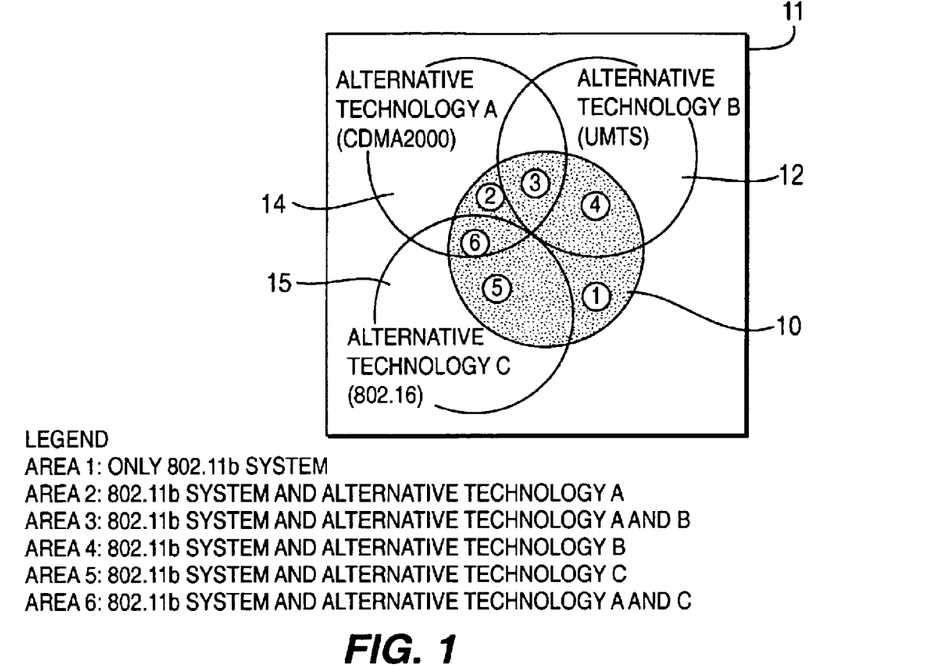
FIG. 1 illustrates a WLAN whose geographic coverage area overlaps with that of other available alternative systems.

Referring now to FIG. 1, a WLAN 10 is shown wherein the WLAN's geographical coverage area overlaps with that of various alternative technologies A, B, C. For purposes of explaining the invention, alternative technology A 14 is CDMA 2000, alternative technology B 12 is a UMTS, and alternative technology C 15 is an 802.16 network. It is important to note, however, that the alternative technologies may be any type of wireless system. Furthermore, the technologies that overlap with the WLAN may be the same type of technology being used in the WLAN. That is, an alternative technology may be the same type of system as that which a WTRU hands over from. For example, handover information may be broadcast in one 802.11b network for handing over to another 802.11b network which has a different operator but overlapping coverage areas.

For purposes of describing a preferred embodiment of the present invention, the WLAN 10 will be referred to as an 802.11b network 10. It is important to note, however, that the WLAN 10 may be any type of WLAN such as, for example, an 802.11a network, an 802.15 wireless personal area network or any other type of wireless area network.

Users operating WTRUs in an 802.11b network may wish to handover to an alternative system for a variety of reasons. For example, a WTRU may be going out of range of the 802.11b network or a user may want a higher level of security/quality of service (QoS) that is available with an alternative system such as a PLMN, for example. Furthermore, a user may want to handover because of the relative cost of an alternative system versus a WLAN, or may want to utilize the services of an alternative system that are not available on the WLAN in which the user is operating.

Regardless of the reason, handing over to an alternative technology 12, 14, 15 requires information about the availability of the alternative technologies 12, 14, 15 in the area. Pursuant to the present invention, handover information is broadcast in the WLAN 10 so that WTRUs receive the required handover information without having to perform their own search. From the handover information received by the WTRUs, the WTRUs may decide which of the available alternative technologies 12, 14, 15 with which to interact.

Figure 2:
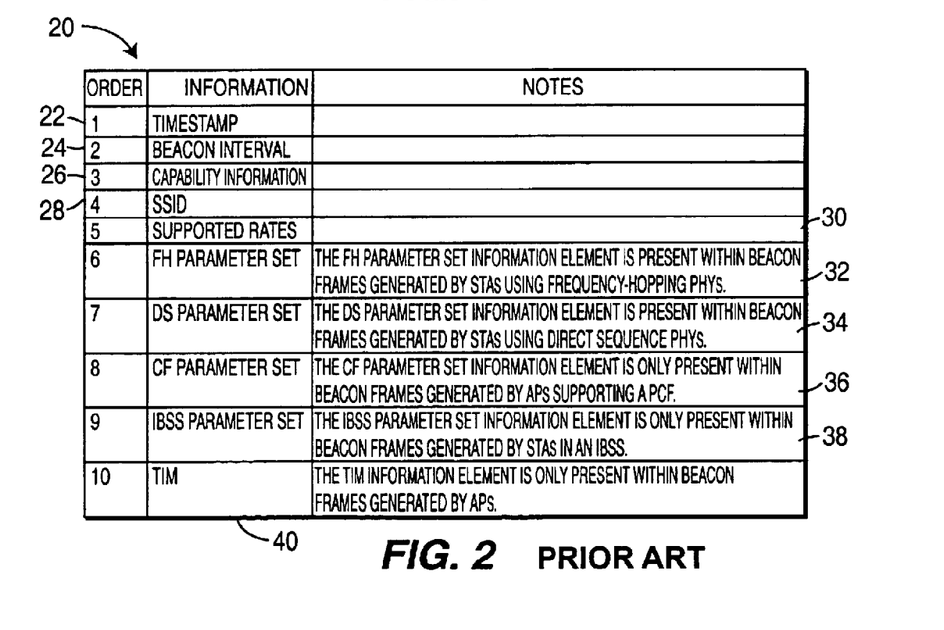
FIG. 2 is a prior art beacon frame structure of a beacon frame used in conventional WLANs.

WLANs typically provide management information to WTRUs in the form of beacons. Referring now to FIG. 2, a prior art beacon frame structure is shown and indicated generally with reference numeral 20. The beacon 20 includes a timestamp 22 which is used by WTRUs to update their local clocks thereby enabling synchronization between all WTRUs associated with a particular AP. Also included is a beacon interval 24. The beacon interval 24 represents the amount of time between beacon transmissions, allowing WTRUs to be in a sleep mode between transmissions.

The capability information 26 provides requirements that must be met by WTRUs wishing to belong to particular WLANs. The service set identifier (SSID) 28 identifies the WLAN. Typically, before associating with a particular WLAN, a WTRU must have the same SSID 28 as the AP through which the WTRU will access the WLAN.

The supported rates 30 indicates the data rates that a particular WLAN supports. For example, where an 802.11b enabled WTRU accesses a WLAN that only supports data rates lower than 11 Mbps, the WTRU will comply with this restriction and limit transmissions to below 11 Mbps.

Beacons typically include information about specific signaling methods in the form of various parameter sets 32, 34, 36, 38 as also included in beacon 20. Typically, parameter sets include frequency hopping (FH) 32, direct sequence spread sprectrum (DS) 34, carrier frequency (CF) 36, and Infrastructure Basic Service Set (IBSS) 38 information. As previously explained, with active scanning, a TIM 40 is provided. The TIM 40 is periodically sent to identify which WTRUs in sleep mode have data frames waiting for them in an AP's buffer.

Figure 3:
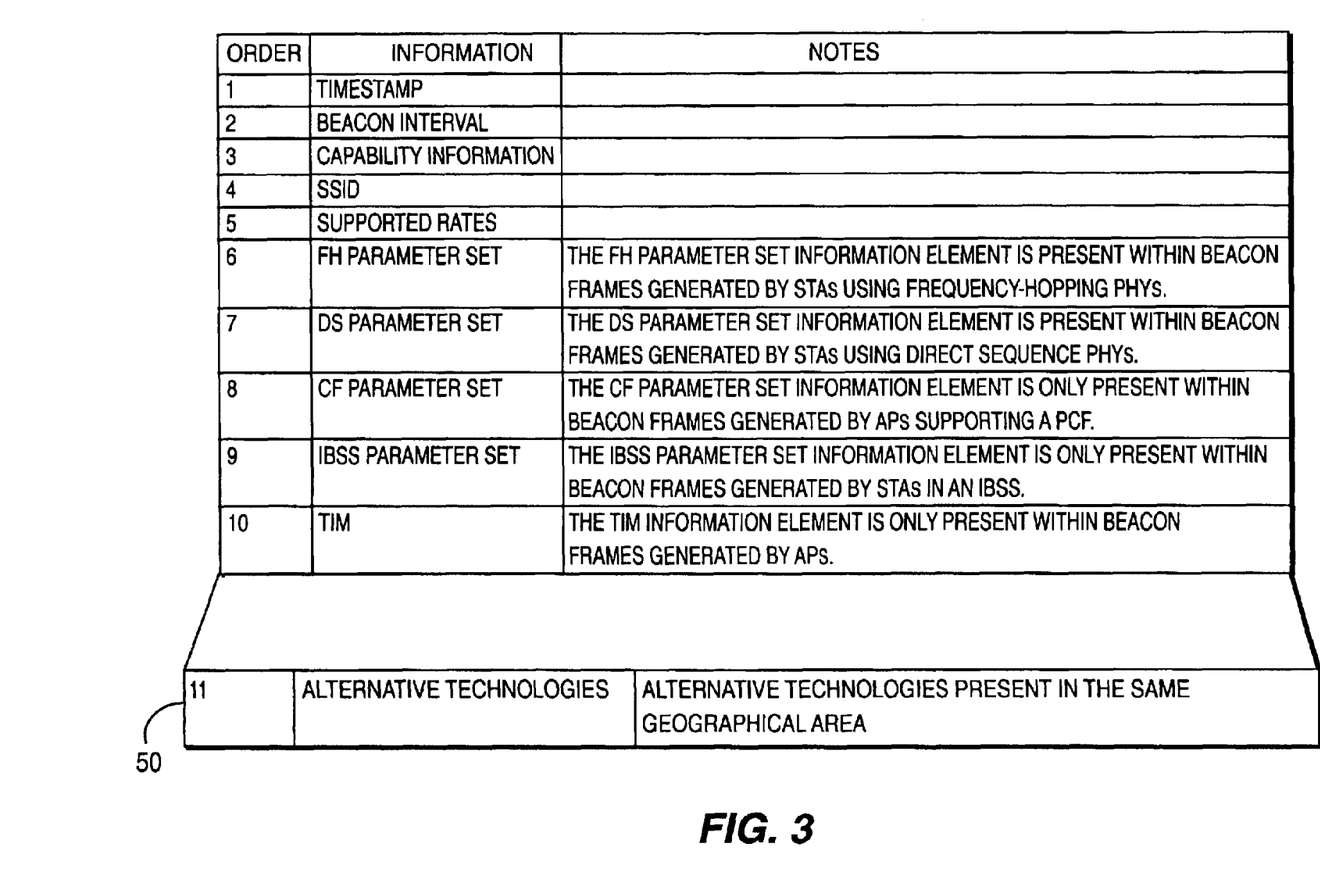
FIG. 3 is a beacon frame structure in accordance with the present invention.

The prior art beacon frame structure 20 does not include information regarding handover. However, the prior art beacon frame structure 20 may be adapted so that additional information elements present in such structures 20 are used for broadcasting handover information about available alternative systems. Referring now to FIG. 3, information 50 regarding available alternative technologies (i.e. alternative system information) is provided within a beacon frame to enable WTRUs to interact with available alternative systems, as desired. For a particular available alternative system for which information is broadcast, the information 50 preferably includes: the type of network (GSM, GPRS, CDMA 2000, UMTS FDD, UMTS TDD, 802.11a, 802.11b, 802.15, 802.16, Bluetooth, etc.), network identity, cell descriptions for surrounding cells, and services offered by the alternative system.

More specifically, with respect to network identity, an indication of the service provider is provided. With respect to the description of surrounding cells, the information preferably includes frequency, channel number, and cell identity related to the specific technology type. For example, in the case of GSM/GPRS systems, the cell identity information will typically include a base station identification code (BSIC). With respect to the services that are offered by the alternative system, the information 50 may also include indications of whether the alternative system offers, for example, an IP Multimedia System (IMS), a short message service (SMS), a multimedia messaging service (MMS), etc.

The information 50 may be downloaded to a WLAN for inclusion in beacons sent out by the WLAN. Alternatively, the WLAN may be equipped with devices for automatically detecting alternative technologies. Other means for providing WLANs with information 50 for broadcasting in beacons may also be implemented as desired.

Figure 4:
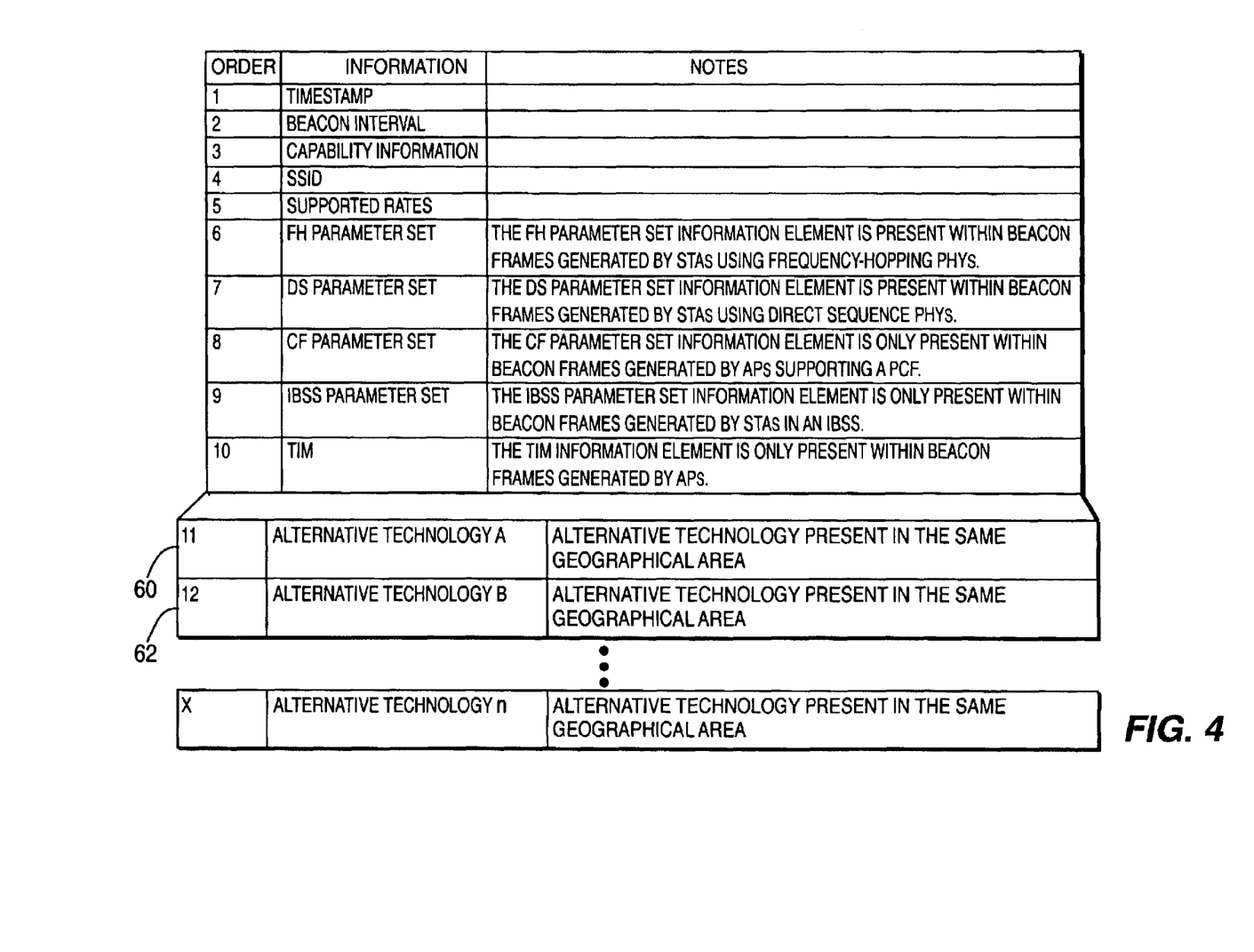
FIG. 4 is a beacon frame structure in accordance with the present invention.

Referring now to FIG. 4, if there are multiple alternative systems available, they should be listed sequentially. That is, for example, in say area 3 of FIG. 1 information 60 about alternative technology A would be followed by information 62 about alternative technology B, as shown in FIG. 4.

Figure 5:
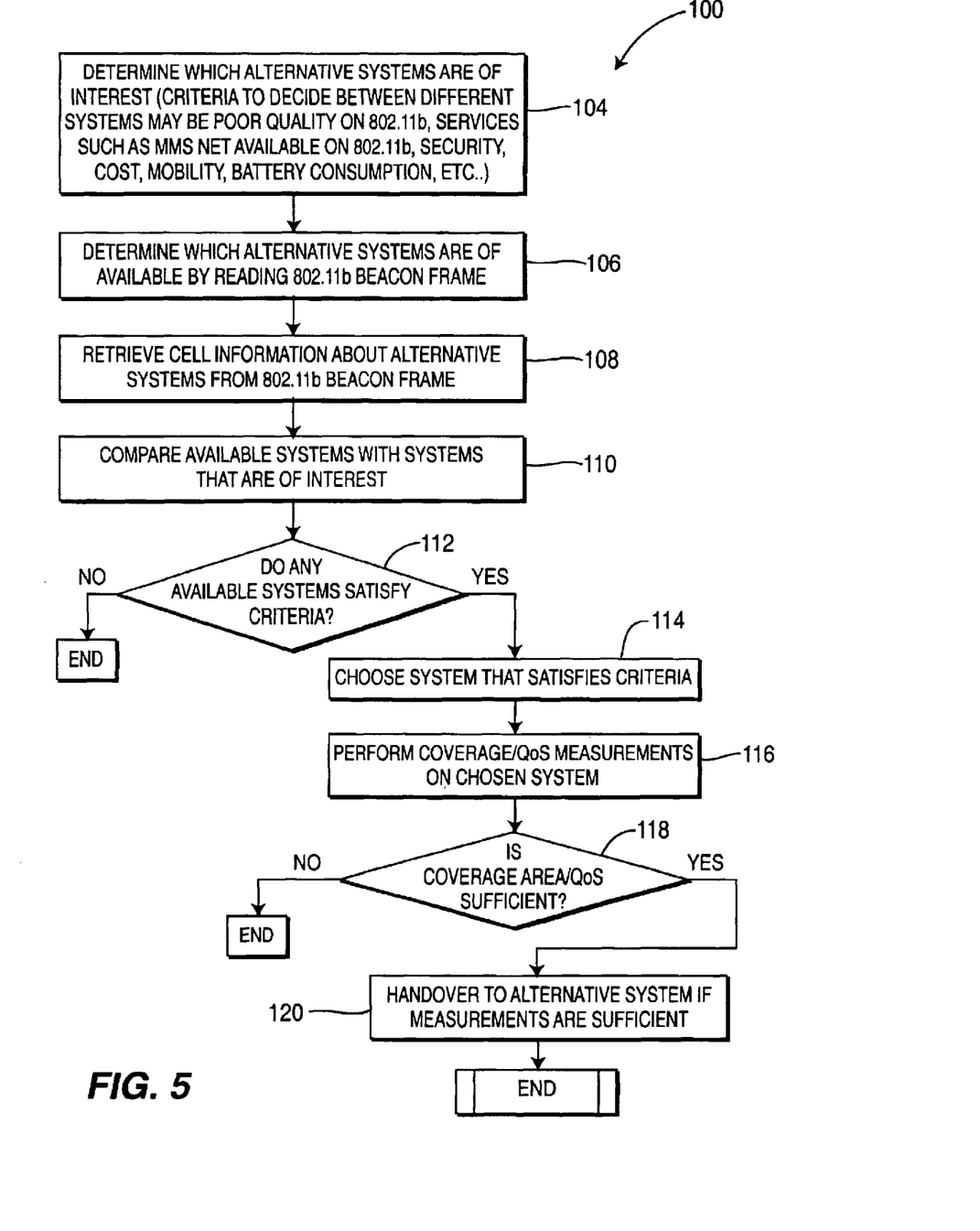
FIG. 5 is a method for automatically handing over WTRUs from a WLAN to an available alternative system according to predetermined criteria.

Referring now to FIG. 5, there is shown a method 100 for automatically handing over WTRUs from a WLAN to an available alternative system according to predetermined criteria. For purposes of describing the present invention, the WLAN is referred to as an 802.11b network.

The method 100 begins in step 104 by determining which alternative systems are of interest. This determination may be made by a WTRU or by the 802.11b network or a combination of the two and may be based on predetermined criteria specifying when to handover to an available alternative system.

The predetermined criteria may be based on a certain minimum criteria, based on factors such as the exemplary reasons for handing over from a WLAN that were provided above, or based on any other reasons, as desired. For example, such criteria may simply be related to quality. That is, if the quality of service (QoS) falls below a predetermined value in an 802.11b (or other type of WLAN) the criteria may specify that the user be handed over to any available alternative system regardless of other factors. Alternatively, the criteria may specify that where the QoS falls below the predetermined value, the user is handed over unless the monetary cost of using the available alternative system is some percentage greater than the monetary cost of using the WLAN in which the user is currently operating.

The criteria may also be related to services, mobility, battery consumption or any other criteria related to wireless communication. The various criteria may also be combined as desired. For example, users may wish to handover to an alternative technology having MMS, but not where their battery power is below a predetermined level.

Once the alternative systems that are of interest are determined, the method 100 proceeds to step 106. In step 106, WTRUs determine which alternative systems are available (i.e. which alternative systems have a coverage area that overlaps that of the 802.11b network which is performing method 100). As mentioned, information related to available alternative systems is obtained by the 802.11b network and broadcast in a beacon. Therefore, in step 106, WTRUs may determine which alternative systems are available by reading the 802.11b beacon frame. When reading the beacon frame, the WTRU preferably retrieves cell information about the available alternative systems (step 108). This is preferred because although an alternative system has yet to be selected, it is typically more efficient to obtain cell information (step 108) about all of the available alternative systems while reading the beacon (step 106) rather than reading the beacon again once an alternative system has been selected.

Next, in step 110, the available alternate systems are compared with the systems that are of interest. Based on this comparison, it is determined in step 112 whether any of the alternate available systems satisfy the criteria for the systems which are of interest. If no, the method 100 ends and may be performed again as desired. If yes, the method 100 proceeds to step 114 where the available alternative system that satisfies the criteria is chosen. In step 116, measurements of the chosen system's coverage area and QoS are performed. These measurements may be performed using the cell information retrieved in step 108 using procedures known to those skilled in the art.

Once the measurements are complete, the method 100 proceeds to step 118. In step 118, it is determined whether the coverage area and/or QoS of the chosen system is sufficient. With respect to coverage area, the coverage area may be deemed sufficient, for example, where upon being handed over to an alternative technology, a user is not prone to being handed over to another alternative technology or back to the 802.11b network. That is, the signal strength in the selected alternative technology would have to be sufficient to support the required communication. If the signal strength were not sufficient, the WTRU, upon being handed over, would be prone to being handed over to another technology or back to the 802.11b network. This determination acts as a double check in that although the 802.11b network should not broadcast information related to alternative systems that cannot accept WTRUs operating in the 802.11b network's coverage area, it may be that the information has changed. For example, it may be that the information has changed due to, for example, the alternative technology becoming unavailable because of power failure.

With respect to QoS, the QoS may be considered sufficient where the QoS meets a predetermined value. The criteria for performing determination 118 (i.e. whether coverage area and/or QoS is sufficient) may be set based on operator preference as desired.

If the measurements are not sufficient, the method 100 ends and the user remains in the 802.11b network. If the measurements are sufficient, the user is handed over to the chosen available alternative system (step 120). Once handed over, the method 100 ends.

Figure 6:
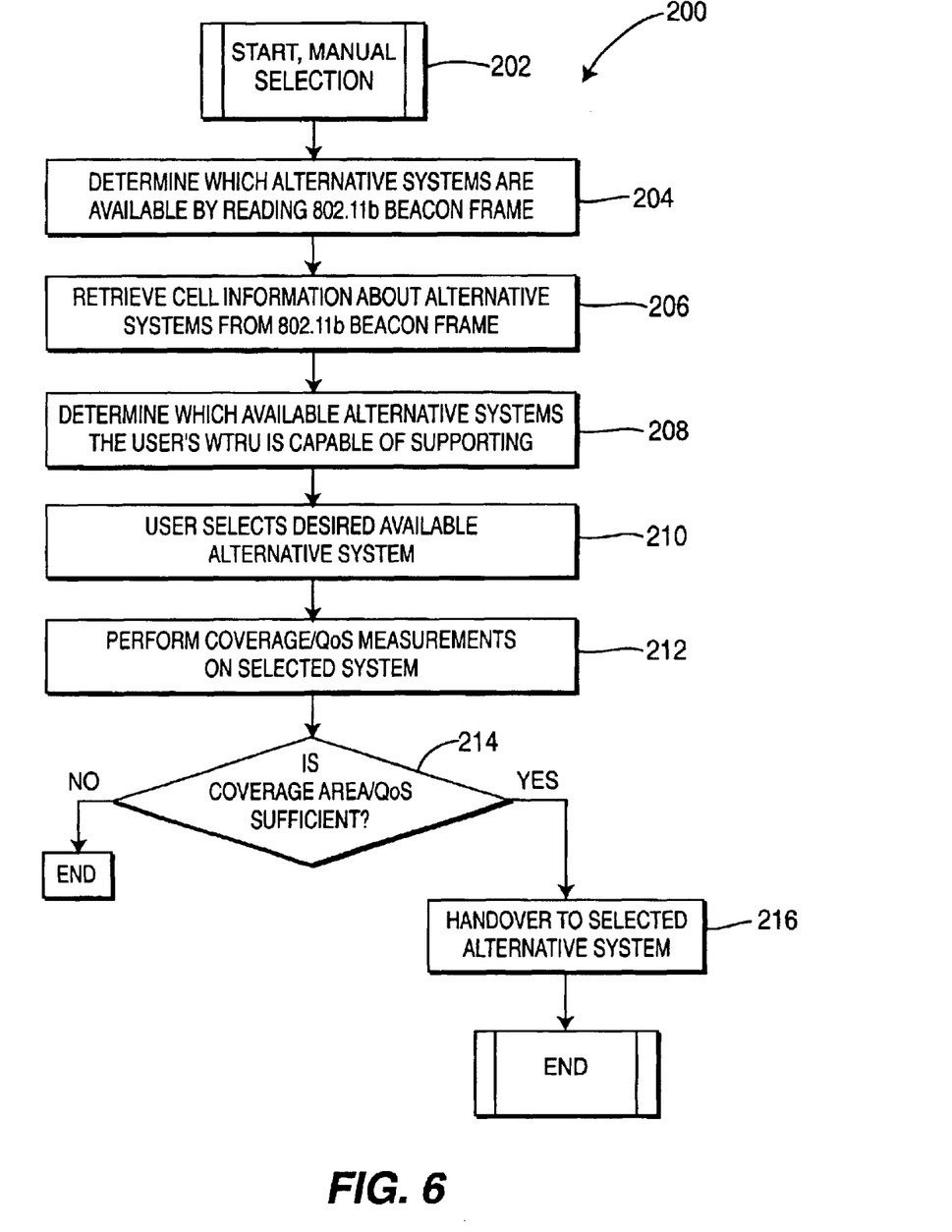
FIG. 6 is a method wherein users operating WTRUs in a WLAN may manually handover to alternative systems whose geographical coverage areas overlap that of the WLAN.

Referring now to FIG. 6, a method 200 is shown wherein users operating WTRUs in a WLAN may manually handover to alternative systems whose geographical coverage areas overlap that of the WLAN. To begin, a user indicates that there is an interest in implementing a handover to an alternative system by activating a manual selection option in a WTRU (step 202). The manual selection option may be activated using any type of manual activation such as executing a button, voice activation, etc. Next in step 204, the WTRU determines which alternative systems are available by reading an 802.11b beacon frame provided by the 802.11b network as explained above (step 204). While reading the beacon frame, the WTRU preferably retrieves cell information about the available alternative systems (206). In step 208, the WTRU determines which available alternative systems the user's WTRU is capable of supporting.

In step 210, the user selects the desired available alternative system. Note, in this step, the user is preferably given the option of selecting only those available alternative systems that the user's WTRU is capable of supporting.

After an available alternative system is selected, coverage and QoS measurements are performed on the selected system in step 212. Again, as with method 100, if in step 214 the coverage area and/or QoS is determined to be sufficient, the WTRU is handed over to the selected system in step 216. Once the WTRU is handed over, the method 200 ends.

Figure 7:
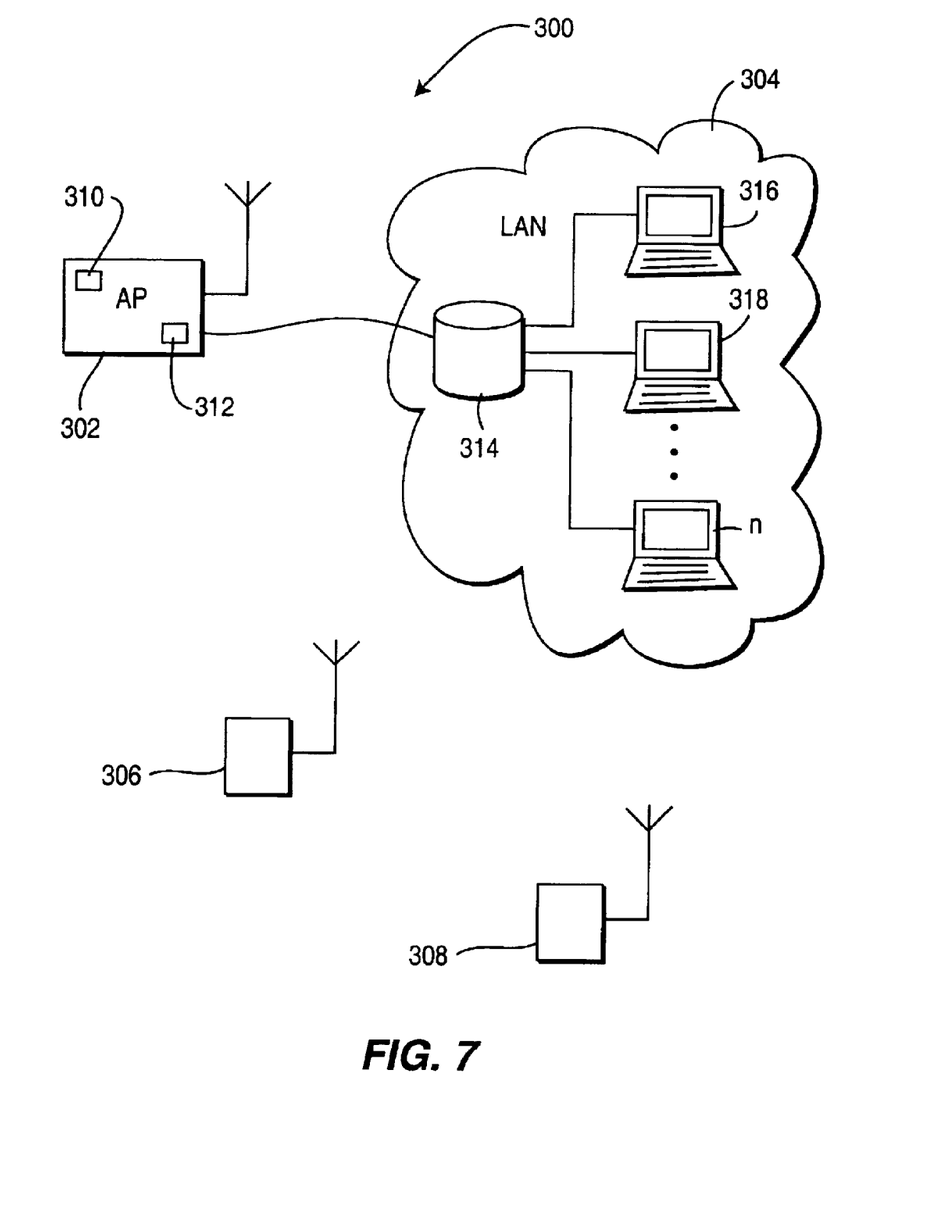
FIG. 7 is a WLAN where WTRUs operating therein may handover to alternative systems whose geographical coverage areas overlap that of the WLAN.

Referring now to FIG. 7, a WLAN 300 in accordance with the present invention is shown. For purposes of describing the invention, however, the WLAN 300 includes an AP 302 for providing an interface between a local area network (LAN) 304 and WTRUs 306, 308 operating within the coverage area of the WLAN 300. WLANs may include any number of APs and WTRUs as desired. LANs are well known in the art, but by way of example, the LAN 304 may include a server 314 and any number of computers 316, 318 . . . *n*.

As previously explained, the WLAN 300 broadcasts handover information in a beacon frame so that WTRUs 306, 308 may easily retrieve the information and handover (either automatically or manually) to available alternative systems. The handover information may be downloaded or automatically detected (periodically or in real time) to/by the WLAN 300 wherein it is distributed to APs. The handover information may be distributed or otherwise provided to the APs as desired. By way of example, handover information relevant to geographic coverage areas serviced by AP 300 may be stored in a local memory 310. When AP 300 broadcasts its beacon signal, a processor 312 may be provided so that handover information which is appropriate for the AP's 300 coverage area is accessed from memory 310 and broadcast to the WTRUs 306, 308 within that coverage area. Of course, the manner in which the handover information is provided and stored to/in the APs and the manner in which the handover information is broadcast may be implemented as desired.

Although the present invention has been described in detail, it is to be understood that the invention is not limited thereto, and that various changes can be made therein without departing from the scope of the invention, which is defined by the attached claims.

What is claimed is:

1. A wireless local area network (WLAN), the WLAN having a geographic coverage area which at least partially overlaps coverage areas of alternative wireless communication systems, the WLAN comprising:
   an access point comprising:
      means for providing a plurality of wireless transmit/receive units (WTRUs) with wireless access to the WLAN; and
      means for broadcasting a beacon frame including handover information for handing WTRUs over from the WLAN to one of the available alternative wireless communication systems, the handover information including cell information necessary for establishing a wireless connection to the alternative wireless communication systems;
   whereby the WTRU directly establishes a wireless connection to a selected wireless communication system utilizing the cell information without performing additional search for obtaining the cell information from the selected wireless communication system.

2. The wireless local area network of claim 1 wherein the handover information includes information related to network type.

3. The wireless local area network of claim 1 wherein the handover information includes information related to network identity.

4. The wireless local area network of claim 1 wherein the handover information includes cell information for cells surrounding the cell serviced by the access point.

5. The wireless local area network of claim 1 wherein the handover information includes information related to the types of services offered by an available alternative system.

6. The wireless local area network of claim 1 wherein at least one of the available alternative technologies is a PLMN.

7. The wireless local area network of claim 1 wherein at least one of the available alternative technologies is another wireless local area network.

8. The wireless local area network of claim 1 wherein the wireless local area network is an 802.11b network.

9. A method for handing over a wireless transmit/receive (WTRU) from a wireless local area network (WLAN) to an available alternative wireless communication system having a geographic coverage area which at least partially overlaps coverage areas of the WLAN comprising:
   broadcasting handover information for handing WTRUs over from the WLAN to the alternative wireless communication system in a beacon frame, the handover information including cell information necessary for establishing a wireless connection to the alternative wireless communication system;
   reading the handover information in the beacon frame;
   retrieving cell information regarding available alternative wireless communication systems from the handover information in the beacon frame;
   selecting an available alternative wireless communication system that is of interest to the user;
   performing coverage and quality of service measurements on the selected system; and
   handing the user over to the selected available system where the measurements are sufficient and establishing a connection to the selected wireless communication system using the cell information in the beacon frame without performing additional search for obtaining the cell information from the selected wireless communication system.

10. The method of claim 9 wherein the step of selecting an available system that is of interest to the user further includes comparing available systems with systems that are of interest to the user.

11. The method of claim 9 wherein the handover information includes information related to network type.

12. The method of claim 9 wherein the handover information includes information related to network identity.

13. The method of claim 9 wherein the handover information includes cell information for cells surrounding the cell serviced by the access point.

14. The method of claim 9 wherein the handover information includes information related to the types of services offered by an available alternative system.

15. The method of claim 9 wherein at least one of the available alternative technologies is a PLMN.

16. The method of claim 9 wherein at least one of the available alternative technologies is another wireless local area network.

17. The method of claim 9 wherein the wireless local area network is an 802.11b network.

18. A method for handing over a wireless transmit/receive unit (WTRU) from a wireless local area network (WLAN) to an available alternative wireless communication system comprising:
   broadcasting handover information for handing WTRUs over from the WLAN to the alternative wireless communication system in a beacon frame, the handover information including cell information necessary for establishing a wireless connection to the alternative wireless communication system;
   reading the handover information to determine whether alternative systems are available for handover;
   retrieving cell information regarding the available alternative systems that are of interest from the beacon frame;
   determining whether the WTRU is capable of supporting the available alternative systems;

selecting an available system that is of interest and the WTRU is capable of supporting;

performing coverage and quality of service measurements on the selected system; and handing over to the selected available system where the measurements are sufficient and establishing a connection to the selected wireless communication system using the cell information in the beacon frame without performing additional search for obtaining the cell information from the selected wireless communication system.

19. The method of claim 18 wherein the handover information includes information related to network type.

20. The method of claim 18 wherein the handover information includes information related to network identity.

21. The method of claim 18 wherein the handover information includes cell information for cells surrounding the cell serviced by the access point.

22. The method of claim 18 wherein the handover information includes information related to the types of services offered by an available alternative system.

23. The method of claim 18 wherein at least one of the available alternative technologies is a PLMN.

24. The method of claim 18 wherein at least one of the available alternative technologies is another wireless local area network.

25. The method of claim 18 wherein the wireless local area network is an 802.11b network.

* * * * *